United States Patent [19]

Brinkschroder et al.

[11] 4,082,488

[45] Apr. 4, 1978

[54] APPARATUS FOR THE EXTRUSION OF TEMPERATURE SENSITIVE THERMOPLASTICS

[75] Inventors: Franz-Jürgen Brinkschröder, Cologne; Axel Sandquist, Langenfeld; Friedrich Johannaber, Lohmar, all of Germany

[73] Assignee: Bayer Aktiengesellschaft, Leverkusen, Germany

[21] Appl. No.: 745,938

[22] Filed: Nov. 29, 1976

[30] Foreign Application Priority Data

Dec. 5, 1975 Germany .................... 2554712

[51] Int. Cl.² ........................... B29F 3/06; B29F 3/08
[52] U.S. Cl. ........................... 425/204; 366/85; 425/207; 425/209; 425/378 R; 425/817 C; 425/461

[58] Field of Search ............... 159/2 E; 264/176 R, 264/51; 198/625, 671; 259/191, 192; 100/146; 425/378 R, 202, 204, 207, 208, 209, 467, 380, 376 R, 206, 461, 4 C, 817 C; 241/82.4, 82.5

[56] References Cited

U.S. PATENT DOCUMENTS

| 3,421,182 | 1/1969 | Colombo | 425/204 |
| 3,676,034 | 7/1972 | Wendricks | 259/191 |
| 3,965,931 | 6/1976 | Skobel | 425/376 X |

*Primary Examiner*—Francis S. Husar
*Assistant Examiner*—Mark Rosenbaum
*Attorney, Agent, or Firm*—Burgess, Dinklage & Sprung

[57] ABSTRACT

The invention relates to an apparatus for the extrusion of temperature sensitive thermoplastics to form structural rib-free semi-finished products in contra-rotating driven screws.

4 Claims, 1 Drawing Figure

U.S. Patent
April 4, 1978
4,082,488
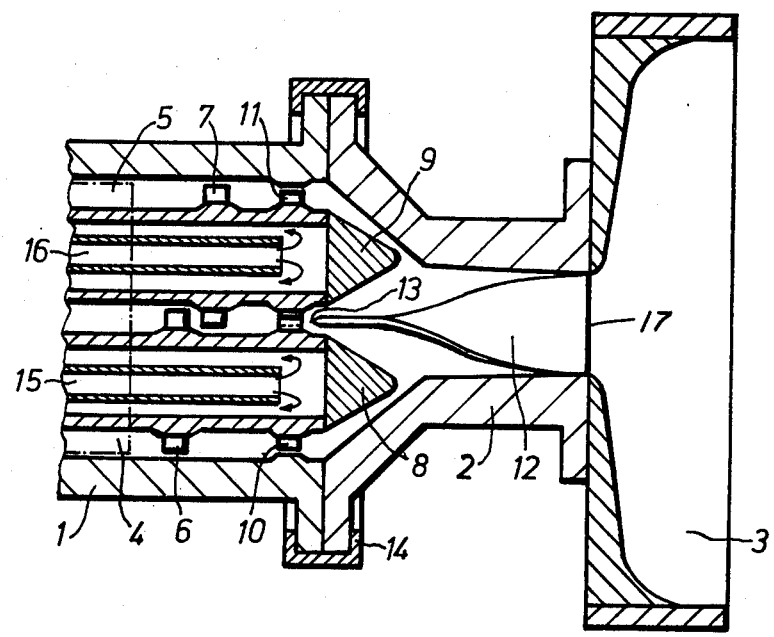

APPARATUS FOR THE EXTRUSION OF TEMPERATURE SENSITIVE THERMOPLASTICS

The invention relates to an apparatus for the extrusion of thermoplastics, in particular temperature-sensitive thermoplastics, to form semi-finished products, such as endless panels for foam plastics production.

For the frequently occurring immediate further processing of multi-component products, in particular foaming of thermoplastics provided with cross-linking and flowing agents, semi-finished products (e.g. endless panels) produced by extruders are required, which despite the low processing temperature in the extruder necessitated by the substance, have such a homogeneity that structural defects such as ribs, depressions etc., are not visible even in a later processing stage (foaming by heating).

Hitherto, numerous devices have been used for this purpose. Thus, static mixing elements such as perforated discs or sieves are known, in which the product is pressed through fixed openings before a broad slot nozzle and thus finely distributed.

The smaller the openings, the quicker the longitudinal streaks disappear; however, at the same time the danger of crosslinking increases as a result of pressure build-up and higher temperatures. The openings, which are not mechanically self-cleaning, and any dead corners lead to operational faults as a result of clogging, to reductions in quality as a result of dead space particles carried along and to production down-time as a result of the necessity of frequent cleaning.

Of the dynamic devices, those should be mentioned in which distribution elements, such as pins, lozenges and plates, on the screw shaft and/or bore wall are arranged in the product flow in the mixing zone. The product can be substantially homogenised by corresponding elements by kneading, mixing and pulverisation, but at the same time such high shearing temperatures arise that, in the case of compound products, processes (crosslinking, foaming) are triggered off which should only occur after moulding. In addition, with a high throughput, e.g. to supply a subsequently arranged continuously running installation of high output, the single shaft extruder hitherto equipped with such distribution elements is not economic because of the size of the screw which is then necessary.

One possibility of increasing the throughput is to arrange a large number of bores and grooves in a ring on the screw shaft so that by their different oblique positions relative to the main flow axis they make the product flow issue in concentrically arranged layers in a subsequent annular chamber. Because of the long ducts, with thermoplastics containing crosslinking agents, the danger of bores becoming clogged is great. Monitoring is not possible. If defects occur, since they are only detectable after further processing stages, high product losses must be expected.

Static spirals are also used in which the product flow is mixed generally by rotation through 180°. In such an arrangement, a plurality of spirals can be consecutively arranged wherein each following spiral is staggered at 90° C. At low processing temperatures the adjustment within the mixture is too low to avoid relaxation phenomena in further processing so that longitudinal markings occur in the final product as a result.

The object of the invention is to provide an apparatus which permits the production of extruded simi-finished products, in particular of endless plastic panels, from a mixture of various components in differing quantities in the form of powder, grit and/or granules at temperatures just above the lowest melting point or in the lower melting range at a high throughput, and the homogeneity of which is sufficiently high that even in subsequent processing (e.g. foaming) structural defects do not become visible.

According to the invention, there is provided an apparatus for the extrusion of thermoplastics, comprising a housing having two contra-rotatable screws arranged therein, wherein on the free ends of the cores of the screws, downstream of the termination of the screw threads, a deflection element is arranged on each core, the deflection elements being staggered in the direction of flow in relation to each other, and downstream of the deflection elements a toothed wheel is arranged on each core so as to mesh with each other and perform a combing function, and an adaptor connected to the outlet from the housing, having a guide plate arranged therein, the guide plate being twisted through approximately 90° and having a straight input edge arranged substantially at right angles to the plane passing through the axes of the screws.

The advantages achieved with the invention are in particular that after a known mixing of the product by the deflection elements on the screw cores and the contra-rotating screws, the product flow is broken down by the toothed wheels into a plurality of small individual strands having almost homogeneous structures, and an indefinite confluence in the wedge between both screws is avoided by the combing teeth. Immediately after the toothed wheels, both product flows, after a separate rotation through 90° in a guide spiral, are laid upon one another in full horizontal width so that even after further processing no relaxation defects as a result of the confluence of the screw flows are visible. The double screws allow the throughput of large quantities with low power absorption as a result of low flow resistance in the toothed wheels used. In addition, the toothed wheels are stable and can be cheaply produced. Faults as a result of the clogging of individual paths in the toothed wheels are avoided by the self-cleaning of the combing teeth.

In a particular embodiment of the apparatus according to the invention, a broad slit nozzle is connected to the outlet of the adaptor. The juxtaposed screws by means of the oval outlet adaptor provide a good predistribution for the broad slit nozzle.

In a further embodiment coolant ducts are arranged in the cores of the screws. In the case of heat sensitive substances, the temperatures in the extruder can then be conrolled by cooling.

In one embodiment, the deflection elements are toothed wheels arranged staggered in relation to one another. The toothed wheels are simple to produce and easy to exchange.

An embodiment of the invention is illustrated in the accompanying drawing and is described in more detail in the following:

A housing 1, which opens opposite a feed opening via an oval outlet adaptor 2 in a broad slit nozzle 3, contains two counter-current driven screws 4, 5, which are each provided at the free end of the cylindrical core with a toothed wheel 6, 7 arranged staggered in relation to one another in the axial direction and upstream of the conical injector 8, 9 with a further toothed wheel 10, 11 arranged so as to perform a combing function. Downstream of the combing teeth there is located a guide plate 12 twisted through 90°, having a straight input edge 13 which extends between the walls in the narrowest cross-section of the two intersecting bores of the housing and whose output edge 17 ends just before the broad slit nozzle. In the cores of the screws are arranged coolant ducts 15, 16.

EXAMPLE

A counter-current extruder having a screw length of 18 D at a shaft diameter D = 100mm is supplied with a mixture of 84 parts polyethylene plastics granulate having a density of 0.923 $Mg/m^3$ MFI 3.5–4.1 g/10mm, 15 parts blowing agent powder ADCF azodicarbonamide and 1 part crosslinking agent powder peroxide. After processing in the extruder, the material is extruded via a guide plate twisted through 90° and 220mm long out of a broad slit nozzle. At a throughput of 200 kg/h and a temperature of from 135° to 140° C and a shaft rotational speed of 28 rpm, panels having a width of 400 mm and a thickness of 3.25 mm were produced which during later crosslinking and susequent foaming, displayed no obvious structural defects.

We claim:

1. An apparatus for the extrusion of thermoplastics, comprising a housing having an outlet and two contra-current rotatable screws arranged therein each having a core with the free ends of the cores of the screws disposed downstream of the termination of the screw threads, a deflection element disposed around each core and staggered in the direction of flow in relation to each to each other, and downstream of the deflection elements a toothed wheel disposed around each core and aligned to mesh with each other to effect a combing function, and an adaptor connected to the outlet of the housing, and having an outlet and a planar guide plate disposed therein and twisted through approximately 90° and having a straight input edge disposed between the two screws arranged substantially at right angles to the plane passing through the axes and an output edge at the outlet of the adaptor.

2. An apparatus according to claim 1, further comprising a broad slit nozzle connected to the outlet of the adaptor.

3. An apparatus according to claim 1, further comprising coolant ducts disposed in the cores of the screws.

4. An apparatus according to claim 1, wherein the deflection elements are toothed wheels.

* * * * *